United States Patent [19]

Plunkett

[11] 3,911,340

[45] Oct. 7, 1975

[54] METHOD AND APPARATUS FOR AUTOMATIC IR COMPENSATION

[75] Inventor: Allan Barr Plunkett, Erie, Pa.

[73] Assignee: General Electric Company, Erie, Pa.

[22] Filed: Oct. 1, 1973

[21] Appl. No.: 402,253

[52] U.S. Cl. ............................... 318/230; 318/231
[51] Int. Cl.² ............................................. H02P 7/41
[58] Field of Search ................... 318/227, 230, 231

[56] References Cited
UNITED STATES PATENTS

| | | | |
|---|---|---|---|
| 3,372,323 | 3/1968 | Guyeska | 318/230 |
| 3,512,067 | 5/1970 | Landau | 318/230 X |
| 3,593,083 | 7/1971 | Blaschke | 318/230 X |
| 3,611,089 | 10/1971 | Mokrytzki | 318/227 |
| 3,700,986 | 10/1972 | Cushman et al. | 318/227 |

Primary Examiner—G. Z. Rubinson
Attorney, Agent, or Firm—D. F. Bigelow

[57] ABSTRACT

In induction motors operating at low speeds and at low counter volt levels the terminal voltage component securing the desired machine flux is obscured by the IR drop component. Control of the current and flux density can be objectively accomplished by impressing the correct terminal voltage on the motor. This is accomplished by comparing the desired motor current with the desired motor slip frequency and varying the motor voltage in response to the ratio thereof. The flux signal generated by the summation of the desired values is multiplied by the stator frequency to obtain motor voltage and thereby maintain constant loop gain. An integrator may be used to maintain a zero steady state error.

23 Claims, 8 Drawing Figures

METHOD AND APPARATUS FOR AUTOMATIC IR COMPENSATION

BACKGROUND OF THE INVENTION

This invention relates generally to power control circuits for induction motors and more particularly to voltage control of a variable speed induction motor dirve system.

It is known that in induction motor drive systems the motor voltage must be varied with frequency to maintain the same flux level. By maintaining the same flux level at all frequencies (motor speeds) the rotating magnetic field strength will remain constant providing constant torque capability at the output shaft of the motor. There are a number of basic types of voltage control used since every a-c power unit must control the volts-per-hertz ratio in accordance with the a-c motor requirements. However, because of the IR portion of applied voltage, the volts-per-hertz ratio is not a constant but contains a bias or offset proportional to the IR drop of the a-c motor. The voltage control is normally slaved to the frequency command to provide the optimum voltage for the specific operating frequency. More sophisticated voltage programming is needed when variable torque capabilities are required, especially in low speed operation.

One method of monitoring a constant flux density relationship would require for its implementation a feedback control system taking its input from a flux sensor in the airgap. This arrangement, although possible, does not appear to be practical. Similarly, the use of voltage sensors does not offer a satisfactory method of control.

In a control circuit where the desired slip frequency is added or subtracted to the shaft speed to provide the stator frequency, a moderate degree of resistance drop compensation is achieved by making the motor voltage proportional to the sum of shaft frequency and slip frequency. Since slip frequency is subtracted during periods of electrical braking, this method of IR compensation tends to reduce the difference in torque between motoring and braking. Insufficient compensation results in poor control at low speed since the flux is not constant with changes in slip.

It is therefore an object of this invention to provide a substantially constant flux density relationship irrespective of induction motor frequency.

Another object of this invention is the provision for voltage changes to the motor to compensate for resistance loss at low speeds.

Yet another object of this invention is the provision for substantially constant torque at low speeds of operation.

Still another object of this invention is the provision for automatic IR compensation without the use of flux or voltage sensors.

Yet another object of this invention is the provision for voltage regulation regardless of line voltage changes, load changes, and voltage drop in the motor cables, filters, etc.

A further object of this invention is the provision for an induction motor control circuit which is extremely functional in use and economical and simple in operation.

These objects and other features and advantages become more readily apparent upon reference to the following description when taken in conjunction with the appended drawings.

SUMMARY OF THE INVENTION

Briefly, in accordance with one aspect of the invention a flux signal for an a-c induction motor drive is derived by comparing a current call signal with a motor slip frequency signal. Variance of the voltage with the ratio of call current to slip frequency at low speeds thus compensates for resistance losses and maintains the motor flux level at a constant value. In addition, automatic voltage regulation is obtained without the necessity of using voltage sensors. If the supply voltage is held constant at high speeds, variance of the current call causes a corresponding variance in the slip frequency.

A constant loop gain is maintained by multiplying the flux signal by the line frequency to determined motor voltage. To ensure a zero steady-state error the flux signal may be integrated with an operational amplifier prior to being multiplied.

The motor slip signal is generated by comparing the desired motor current with a signal representing the a-c current from the motor and integrating the summation.

In the drawings as hereinafter described, a preferred embodiment is depicted. However, various other modifications and alternate constructions can be made thereto without departing from the true spirit and scope of the invention.

DESCRIPTION OF THE PREFERRED INVENTION

Figure 1:
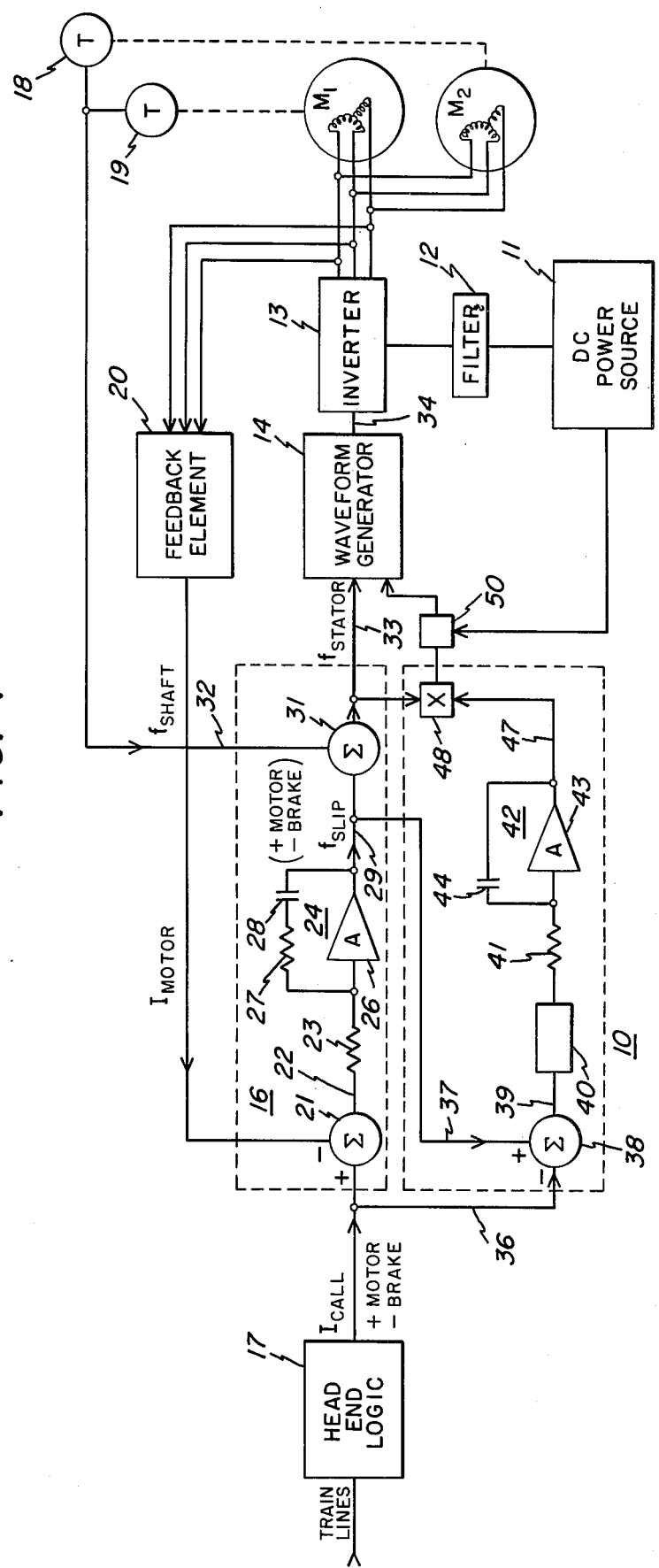
FIG. 1 is a schematic illustration of the preferred embodiment of the invention.

Referring now to FIG. 1, the voltage control circuit of the present invention is indicated generally at 10 and forms part of the power control circuitry of a typical propulsion system having a pair of a-c induction motors $M_1$ and $M_2$ which provide motive power during motoring modes of operation and which act as generators during dynamic braking or regenerative braking modes of operation.

Power to the three-phase a-c induction motors $M_1$ and $M_2$ is provided by a d-c power source 11 through a low pass line filter 12 and and inverter 13. The d-c power source is typically a third rail fed from substations supplying substantially constant d-c voltage with variable transients. The line filter 12 is utilized to minimize interference with any signalling system and to supply the reactive power required for a-c induction motor excitation.

It should be understood that this invention is also applicable for use with power conversion means other than inverters, such as a cycloconverter operating from an a-c source. In such a circuit the d-c power source 11, filter 12, and inverter 13 are replaced by an a-c source and a cycloconverter, with the remaining portion of the circuit operating in a manner substantially the same as with the inverter.

The inverter 13 utilizes solid state components to produce variable frequency, variable voltage, three-phase power from the d-c source to supply the motors $M_1$ and $M_2$ for variable speed operation. In order to obtain the desired torque output values, as well as compensate for line voltage changes, load changes, and voltage drop in the cables, inverter and line filter, it is necessary to vary the voltages, the frequencies, or both. Control of the inverter to obtain the desired frequency and voltage is thus established by a waveform generator 14 having inputs of desired stator frequency, $f_{stator}$, from a frequency control circuit 16, and a desired voltage, V, from the voltage control circuit 10. The waveform generator is generally of the well known type shown and described in Operational Amplifiers, Design and Application, Tobey, Graeme and Huelsman, McGraw-Hill, 1971. The output thereof is preferably a sine wave whose amplitude is determined by the input signal V, and whose frequency is determined by the input signal $f_{stator}$. However, various other waveforms may be generated, as for example, square or sawtooth waves.

One of the inputs into each of the frequency control circuit 16 and voltage control circuit 10 is the desired motor current or $I_{call}$. This d-c signal is generated by the head end logic 17 which converts the trainline or controlled commands to a representative current and thereby torque signal. The $I_{call}$ is a positive signal when operating in a motoring mode and a negative signal when operating in a braking mode. Other input signals into the frequency control circuit include a d-c feedback signal $I_{motor}$, which is proportional to motor current, which is fed back from the motor; and the shaft frequency, $f_{shaft}$, which is fed back from the motors through the tachometers 18 and 19. A feedback element, 20, converts the three motor a-c line currents into the d-c feedback current $I_{MOTOR}$. This may be accomplished in any of a number of ways, three of which are known to use, respectively, the rectified current, real current, or compensated real current.

Figure 2A:
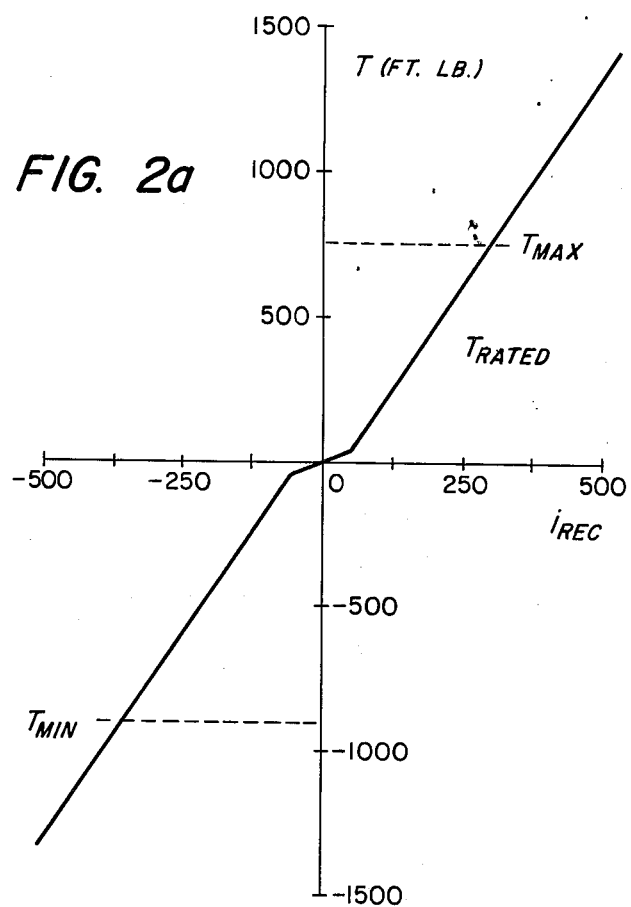
FIGS. 2a and 2b are graphic representations of the steady-state transfer characteristics of torque and voltage as functions of a motor rectified current feedback used in the present invention.

FIG. 2a shows the steady-state transfer characteristic of torque vs. current for a typical motor when using the rectified current, $i_{REC}$, as feedback. The proportional gain of the circuit of FIG. 1 is set for a nominal operation at 750 ft-lb. Here the highest of the three currents from a three phase bridge rectifier is taken as the feedback signal $I_{MOTOR}$. $I_{MOTOR}$ is averaged to remove non-torque producing harmonic current components from the feedback signal. It can be seen that the torque-current characteristic is linear beyond $i_{REC} = 75A$ (magnetizing current) but the relationship does not hold true below that point. Referring to the negative values of $i_{REC}$, it can be seen that a similar relationship exists during periods of braking (dynamic retarding or dynamic regeneration). This condition is thus unsuitable at low torque levels in either motoring or braking. This relationship is essentially independent of speed.

Figure 2B:
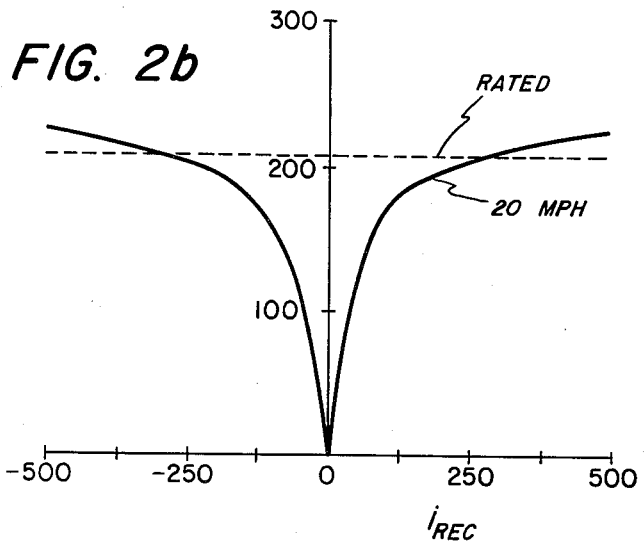

FIG. 2b shows the voltage $V_1'$ across the stator as a function of the rectified current $i_{REC}$ when operating at base frequency (50 Hz). $V_1'$ is different from the line voltage $V_1$ by an amount equal to the resistance drop across the stator. Low torque characteristics are again seen as being unsuitable, but the torque vs. current ($i_{REC}$) characteristics do not vary with speed until zero stator frequency is reached.

Another method of controlling torque is that of using the real component of stator current $i_{REAL}$ as the feedback signal $I_{MOTOR}$. This is similar to the approach shown and described in U.S. Pat. No. 3,512,067 issued to I. D. Landau on May 12, 1970. This method averages the three a-c current components, in phase with the applied voltage, using a phase reference signal from the waveform generator 14. In its simplest form the real component $i_{REAL}$ of terminal current $i_1$ relative to the terminal voltage $V_1$ is maintained constant. Motor slip frequency is adjusted in proportion to the real component of current $i_{REAL}$. Since input power is $V_1 i_{REAL}$ and since $V_1$ increases approximately linearly with frequency, the input power increases linearly with frequency, implying a constant output torque. However, the result is only approximate since the power loss in the motor modifies the results.

Figure 3B:
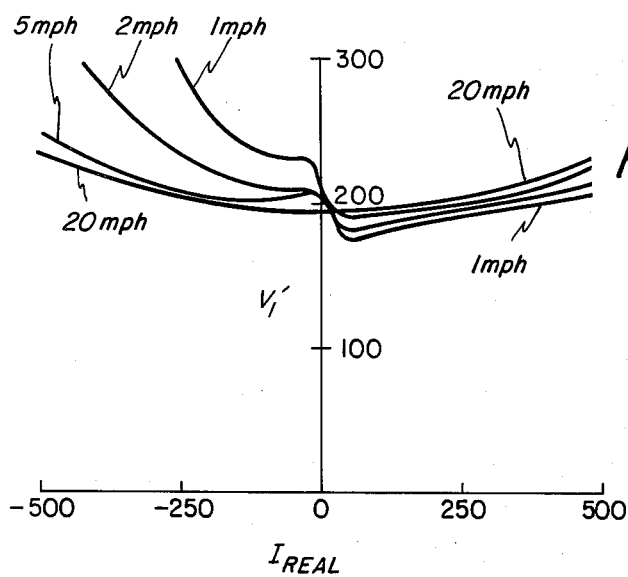
FIGS. 3a, 3b, and 3c show the transfer characteristics between the call current and the resulting flux voltage and line current assuming a linear relationship between current command and slip command in the present invention using uncompensated real current feedback.
Figure 3A:
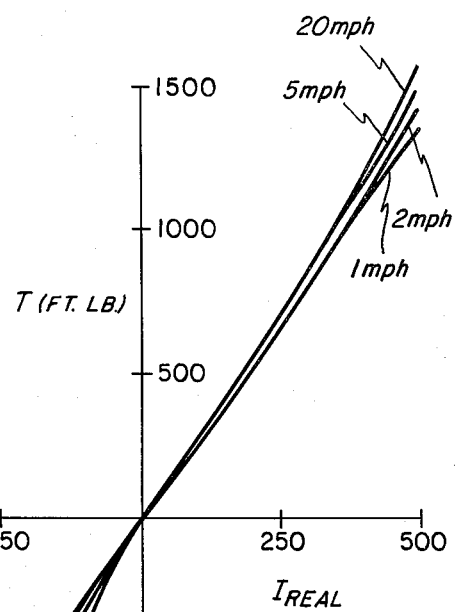

FIGS. 3a, b and c show the transfer characteristics between the call current $i_{REAL}$ and the resulting torque T, voltage amplitude $V_1'$, and line current amplitude $i_L$, assuming a linear relationship between current command and slip command. Again $V_1'$ represents the voltage across the stator after subtracting the resistance drop thereacross. Operation at frequencies of 50, 12.5, 5 and 2.5 Hz are shown. For motoring operation, it is apparent that the control scheme will yield adequate performance. Although the output torque is not independent of frequency, the effect of frequency changes is small. Similarly the line current magnitude $i_L$ and voltage referred to rated frequency, $V_1(v)$ is relatively insensitive to frequency changes indicating satisfactory performance over the entire speed range for any motoring load. Note that the poor control at low values of $i_L$ does not occur.

Figure 3C:
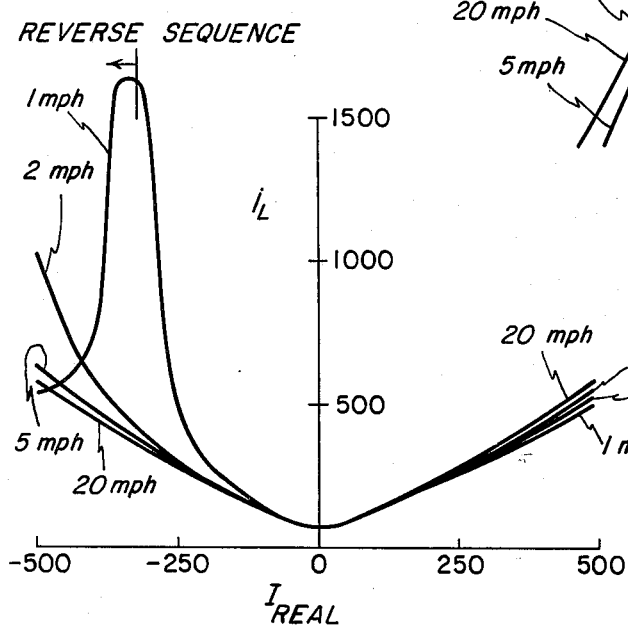

Severe problems are, however, apparent for braking. For a fixed value of $i_{REAL}$ and slip frequency, the torque magnitude increases substantially as frequency is reduced. A more serious defect is evident from the plot of $V_1'$ vs. current command. It is seen that during low speed braking, after subtracting the resistance drop, the voltage $V_1'$ across the stator rises rapidly and motor saturation will occur. A plot of current magnitude as a function of real current $i_{REAL}$ is shown in FIG. 3c. Although the real component of current is under control, the magnitude of current rises rapidly with braking effort. It is clear that currents could exceed the inverter commutating ability during low speed braking.

The third and preferred method of control, using a compensated real current, $i_{com}$, regulates the real component of current relative to the voltage $V_1'$. $V_1'$ is constructed by taking the sum $V_1' = V_1 - I_L R$ where $V_1$ and $I_L$ are instantaneous values. It has been determined that the value of R (stator resistance) used in the calculation can vary from the actual $R_{stator}$ to twice as large without significantly affecting the resulting compensated real current output.

Figure 4A:
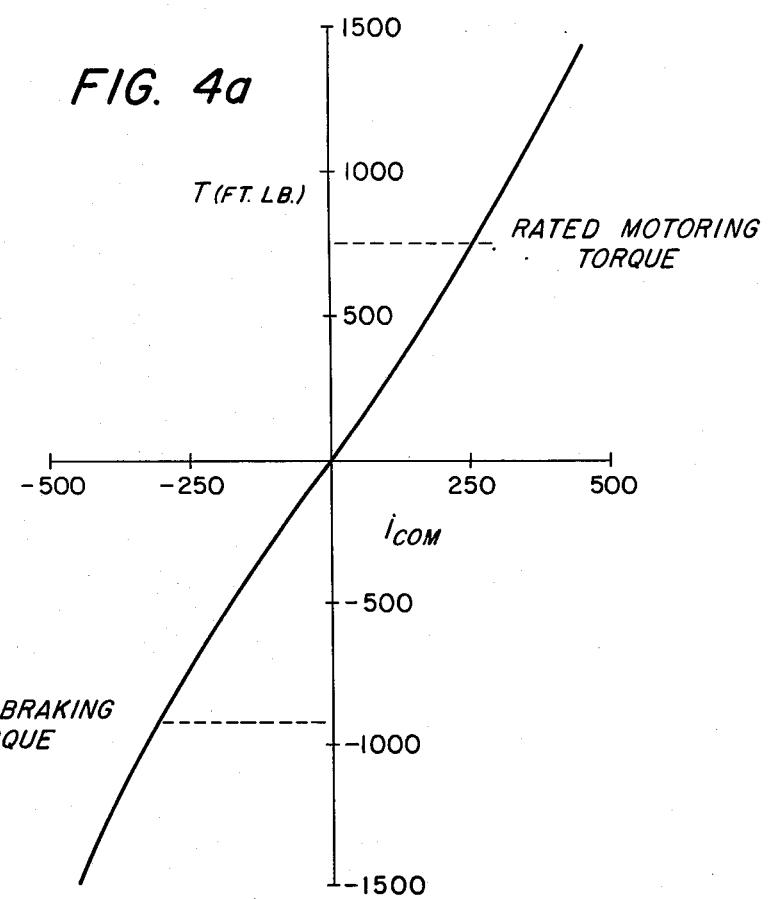
FIG. 4 shows the transfer characteristic of the preferred embodiment when using a compensated real current feedback.
Figure 4B:
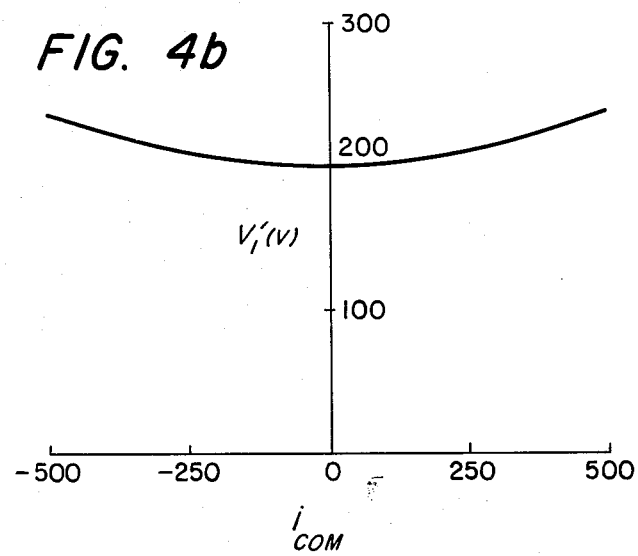

FIG. 4a shows the relationship between torque T and $i_{com}$ when the slip frequency is adjusted linearly with $i_{com}$. Chosen as the nominal values of $i_{com}$ and slip frequency are those values which result in rated motor flux at rated torque. Again 750 ft-lb. was used as the nominal value of torque. Torque is now maintained constant independent of speed. The voltage $V_1'$ rises with increased load, but not severely. If necessary, the rising characteristic can be eliminated by using a nonlinear relationship between the slip frequency and the current magnitude.

Referring more specifically to the frequency control circuit 16, the desired motor current signal $I_{call}$ and the actual motor current signal $I_{MOTOR}$ are d-c signals which are compared in an adder 21 with the difference being sent along line 22 to the integrator 24. The integrator 24, which comprises an operational amplifier 26 with input resistor 23, having as feedback elements resistor 27 and capacitor 28, adjusts the slip to the value required for the desired motor current and hence torque. The desired slip frequency $f_{slip}$ is impressed on line 29 as a positive signal when operating in the motoring mode and as a negative signal when in the braking mode of operation. In the integrator 24, the loop compensation is of the form $(S+W)/S$. The pole at the origin gives a zero steady state error and the zero $(S+W)$ allows a faster loop response for a given damping ratio.

The terminal frequency of the a-c induction motor is set by the adder 31, preferably of the digital type, which adds the input signals of the desired slip frequency $f_{slip}$, and the actual shaft frequency $f_{shaft}$, which is taken in along line 32. The desired frequency signal, $f_{stator}$, is thus derived by reading the shaft speed and adding (for motoring) or subtracting (for braking) the desired slip frequency $f_{slip}$ from the rotor shaft frequency $f_{rotor}$. This function is accomplished digitally due to the high accuracy requirement. The frequency signal $f_{stator}$ is then passed along line 33 to the waveform generator 14 whose output is responsively sent along line 34 to control the inverter 13.

Having established a signal to control the frequency of the power to the induction motor, we now turn to the voltage control circuit 10 whose function is to produce a corresponding voltage signal, $V$, for the waveform generator to control the line voltage to the motors. The representative equation for the current voltage relationship in an a-c induction motor can be expressed approximately as $$I = K_a \left( \frac{V}{f_{stator}} \right) f_{slip}$$

where, $I$ = rotor current
$K_a$ = a constant
$V$ = motor line voltage
$f_{stator}$ = motor line frequency
$f_{slip}$ = motor slip frequency
The flux value $$\left( \frac{V}{f_{stator}} \right)$$

is thus proportional to the ratio $I/f_{slip}$. Therefore, if the ratio $I/f_{slip}$ is monitored, the voltage can be selectively varied in response thereto so as to maintain the flux value $(V/f_{stator})$ at a constant value.

The equation which represents the torque delivered by the induction motor is $$T = K_b \left( \frac{V}{f_{stator}} \right)^2 f_{slip}$$

where, $T$ = torque
$K_b$ = constant
$V$ = motor line voltage
$f_{stator}$ = motor line frequency
$f_{slip}$ = motor slip frequency Combining this with the previous equation gives the relationship:

$$T = \frac{K_b}{K_a^2} \left( \frac{I^2}{f_{slip}} \right) = \frac{K_b}{K_a^2} \left( \frac{I}{f_{slip}} \right) I$$

If the flux value $(V/f_{stator})$, and hence $(I/f_{slip})$ is maintained constant, then $\tau = $ (constant) $(I)$, and the torque is directly proportional to the $I_{call}$. At lower speeds of the motor, (e.g., for vehicle speed of 0–25 mph) it is desirable to maintain a constant torque output of the motor. This is accomplished by pulse width modulation. Therefore, if the voltage is varied so as to maintain a constant flux value $(V/f_{stator})$, then the proper relationships are maintained.

Since at low speeds a voltage change is necessary to compensate for resistance loss this automatically accomplished using the motor feedback current $I_{motor}$ as the feedback signal. Referring again to the voltage control circuit 10 a summer 38 receives desired motor current signals $I_{call}$ from line 36 and the desired slip frequency signals $f_{slip}$ along line 37. The $I_{call}$ signal on line 36 is modified by a proportionality constant in the form of a gain resistor (not shown) to obtain the desired linear relationship between $f_{slip}$ and $I_{call}$. A comparison is made and the difference signal is transmitted along line 39, through a sign changer 40 (+1 motor, −1 brake), to the integrator 42 having input resistor 41, operational amplifier 43, and a feedback loop with capacitor 44. Again the loop compensation used is of the form $K/S$ for zero steady state error. A flux signal (volts/hz) is then transmitted along line 47 to a multiplier 48 where it is multiplied by the speed $f_{stator}$ to obtain the motor voltage value $V$ whose signal is received by the waveform generator 14. The multiplier 48 is generally of a known type, as for example, a time divisional or quarter square multiplier type as shown and described in "Analog Computation," Albert Jackson, McGraw-Hill, 1960. The preferred multiplier is that of the transconductance type. The multiplier 48 allows the circuit to maintain a constant loop gain as speed varies. This is not a necessary component for the operation of the voltage regulation circuit, but improves the operation considerably.

Briefly, the multiplier maintains a constant ratio of motor voltage to frequency applied. The result is a natural constant flux operation of the motor. In addition, the cross connection of frequency variations into the voltage channel greatly improves the stability of the motor control, especially in braking. Also, the flux signal from the voltage control channel is not required to compensate for speed changes and thus does not require fast control action.

A divider 50 is added to the inverter voltage control loop to instantaneously compensate for d-c line voltage changes while operating in the PWM mode of operation. The a-c voltage applied to the motor is the product of the voltage signal, $V$, and the d-c line voltage. Thus, the divider is used to divide the voltage control signal by the d-c line voltage to keep the a-c motor voltage constant. The divider can be inserted either ahead of or following the multiplier as shown. The divider 50 is of a standard type which operates on the principles described in "Analog Computation" referenced hereinbefore.

During a second stage of motoring operation (e.g., vehicle speed of 25 – 45 mph) the voltage feedback loop is typically saturated and the a-c voltage has reached the maximum value corresponding to the d-c line volatage, and is thus maintained at a substantially constant value thereafter. Instead of varying the voltage as in the first stage of operation (0 –25 mph) the $f_{slip}$ is changed to hold the current at a constant value. During this stage of operation the $f_{slip}$ is proportional to speed and the torque is inversely proportional thereto.

In a third stage of operation (e.g., 45 – 80 mph) the $f_{slip}$ has reached a point near the motor pullout frequency and is thereafter held constant.

The current will then decrease as 1/speed and torque will decrease as 1/speed$^2$.

What is claimed as new and desired to secure by Letters Patent of the United States is:

1. A flux regulator for an a-c induction motor having a variable frequency, variable voltage power input comprising:
   a. means for providing a call signal representative of desired motor current;
   b. means coupled to said motor for deriving a feedback signal representative of sensed motor current;
   c. means for generating a slip frequency signal representative of the motor slip frequency at which said feedback signal tends substantially to equal said call signal over a given range of said variable frequency;
   d. means responsive to the relative values of said call signal and said slip frequency signal for deriving a signal representative of the motor flux which is desired to maintain a predetermined substantially constant ratio of said call signal to said slip frequency signal; and
   e. means for varying motor voltage amplitude as a function of said desired motor flux signal, thereby maintaining a substantially constant motor flux.

2. A flux regulator as set forth in claim 1 wherein said last-mentioned means varies motor voltage in accordance with a voltage signal which is produced by multiplying said desired motor flux signal by a signal which varies with the value of said variable frequency, thereby maintaining substantially constant loop gain.

3. A flux regulator as set forth in claim 1 wherein said means for deriving the desired motor flux signal includes summing means for obtaining an error signal comprising the difference between signals corresponding to said slip frequency signal and to said call signal, respectively, and means for integrating said error signal, thereby to provide zero steady state error.

4. A flux regulator as set forth in claim 3 wherein said call signal has a magnitude proportional to the desired magnitude of motor current and a relative polarity indicative of whether a motoring or a braking mode of operation is desired and wherein said desired motor flux signal deriving means also includes means for inverting the polarity of said error signal during operation in the braking mode.

5. A flux regulator as set forth in claim 4 wherein said feedback signal is derived from the real component of motor current.

6. A flux regulator as set forth in claim 1 wherein said slip frequency signal generating means comprises means for comparing said feedback and call signals to obtain a current error signal equal to their difference and means for deriving said slip frequency signal from the time integral of said current error signal.

7. A flux regulator as set forth in claim 6 and including summing means having as inputs said slip frequency signal and a signal representative of the rotational speed of the induction motor shaft, and having as an output a frequency signal representative of the desired frequency of the variable frequency power input.

8. A flux regulator as set forth in claim 6 wherein said feedback signal is derived from the real component of motor current.

9. A flux regulator as set forth in claim 1 wherein said call signal comprises a variable d-c voltage.

10. A flux regulator as set forth in claim 1 and including summing means having as inputs said slip frequency signal and a signal representative of the rotational speed of the induction motor shaft, and having as an output a desired frequency signal representative of the desired frequency of the variable frequency power input.

11. A flux regulator as set forth in claim 4 wherein said voltage varying means includes a waveform generator having as inputs said desired frequency signal and said desired motor flux signal, and having as an output signal a waveform whose frequency corresponds to said desired frequency and whose amplitude varies with said flux signal.

12. A flux regulator as set forth in claim 11 and including an inverter circuit interconnected between said induction motor and a d-c power source and controlled by said waveform generator for applying to said motor alternating voltage whose frequency and amplitude correspond to said waveform.

13. A flux regulator as set forth in claim 12 and including means connected to said d-c power source for varying the amplitude of said waveform generator output signal as an inverse function of the magnitude of d-c line voltage so as to compensate for voltage changes in the d-c power source.

14. A power control system for an a-c induction comprising:
   a. an inverter for receiving a current from a d-c source and providing variable frequency, variable voltage a-c power to the induction motor;
   b. an inverter control circuit for controlling the frequency and voltage of the inverter output to the induction motor;
   c. a current control circuit having as representative input signals a desired motor current signal and an actual motor current signal and having as an output signal responsive to the difference therebetween, a signal representative of the slip frequency desired to minimize said difference;
   d. a frequency control circuit having as representative input signals a motor shaft speed signal and said desired slip frequency signal and having as a summation output signal to said inverter control circuit a stator frequency signal; and
   e. a voltage control circuit having as input signals the desired motor current signal and the desired slip frequency signal and having as an output signal responsive to the ratio thereof, a signal representative of the motor flux which is desired to maintain said ratio substantially constant, said inverter control circuit being responsive to said desired motor flux signal for varying the inverter output voltage as a function thereof, thereby providing flux regulation and automatic IR compensation for the motor.

15. A power control system as set forth in claim 14 wherein said voltage control circuit further includes a multiplier circuit, said multiplier circuit being connected to and receiving stator frequency signals from said frequency control circuit whereby said desired motor flux signal is multiplied by said stator frequency signal to provide a voltage signal to said inverter control circuit and thereby maintain constant loop gain.

16. A power control circuit as set forth in claim 14 wherein said voltage control circuit further includes a divider circuit, said divider circuit being connected to said d-c source and receiving therefrom a d-c signal representative of the voltage magnitude of said source, whereby said desired motor flux signal is divided by said d-c signal so as to compensate for voltage changes in the d-c power source and thereby prevent corresponding changes in the a-c motor voltage.

17. A power control system as set forth in claim 14 and including in said voltage control circuit an integrator to obtain zero steady-state error.

18. A flux regulator as set forth in claim 14 wherein said actual motor current signal is derived from the real component of motor current.

19. A method of regulating the flux of an a-c induction motor having a variable frequency, variable voltage power input, comprising the steps of:
  a. providing a call signal representative of the desired motor current;
  b. generating a slip frequency signal representative of the slip frequency at which the actual motor current will substantially equal said desired motor current over a given range of said variable frequency;
  c. comparing said call and slip frequency signals to obtain a signal representative of the motor flux which is desired to maintain a predetermined substantially constant ratio of said call signal to said slip frequency signal; and
  d. varying said motor voltage as a function of said desired motor flux signal to thereby maintain a substantially constant flux density in the motor.

20. A power control system for an a-c motor comprising:
  a. power conversion means for receiving current from a power source and for providing a-c power output of variable frequency and variable voltage to an alternating current motor;
  b. a control circuit for said power conversion means, comprising first and second inputs, for controlling the frequency of said a-c power output of the power conversion means responsive to signals applied to said first input and for controlling the voltage of said a-c power output of the power conversion means responsive to signals applied to said second input;
  c. means to produce a stator frequency signal the value of which is determined by the error between a feedback signal representative of a sensed motor parameter and a call signal representative of the desired value of said parameter;
  d. means for coupling said stator frequency signal to said first input of the control circuit;
  e. a source of motor flux signal representative of desired motor flux;
  f. multiplier circuit means comprising a first input connected to receive said motor flux signal and a second input connected to receive said stator frequency signal to provide a voltage signal which varies with the product of said motor flux and stator frequency signals; and
  g. means for coupling said voltage signal to said second input of said control circuit.

21. A power control system for an a-c induction motor as set forth in claim 18 wherein said power conversion means comprises an inverter adapted to receive current from a d-c source and wherein said stator frequency signal producing means comprises summation means responsive to a motor shaft speed signal and to a desired slip frequency signal to produce said stator frequency signal.

22. A power control system as set forth in claim 20 wherein said motor flux signal source comprises means for integrating an error signal derived from the difference between a signal representative of the slip frequency of the motor and said call signal.

23. The power control system of claim 22 wherein said motor parameter is current.

* * * * *